United States Patent [19]
Johansson

[11] 3,990,585
[45] Nov. 9, 1976

[54] ARTICLE EXCHANGE MECHANISM

[75] Inventor: Oskar Reinhold Johansson, Cincinnati, Ohio

[73] Assignee: Cincinnati Milacron, Inc., Cincinnati, Ohio

[22] Filed: Jan. 12, 1976

[21] Appl. No.: 648,129

[52] U.S. Cl. ............................. 214/1 BD; 29/568; 214/147 T
[51] Int. Cl.² ........................................... B23Q 5/32
[58] Field of Search .......... 214/1 BD, 147 T, 1 BV, 214/1 BC, 1 BH, 151; 29/568

[56] References Cited
UNITED STATES PATENTS 3,722,711   3/1973   Seidel ............................. 214/1 BD
3,811,179   5/1974   Anderson ..................... 214/1 BD X Primary Examiner—Robert J. Spar
Assistant Examiner—George F. Abraham
Attorney, Agent, or Firm—Jack J. Earl

[57] ABSTRACT

This disclosure is of an article exchange mechanism of the type suited for use in exchange of tools or workpieces in a machine tool. The mechanism is asymmetrical in the sense that each of the positions between which articles are exchanged may be at a different distance from the origin of coordinate axes extending through these positions.

13 Claims, 3 Drawing Figures

ARTICLE EXCHANGE MECHANISM

BACKGROUND OF THE INVENTIONS

This invention is particularly useful in machine tools for exchange of parts or tools between positions which are located on intersecting coordinate axes, the part being in alignment or one of the axes in each position. In a tool exchanging machine, for example, such an exchange might be between a spindle extending horizontally out from the front of the machine to a storage position either on top of the machine or on the side of the machine; in either case requiring an arcuate movement of the exchanged parts through 90°. In the prior art when such a movement was required and made by a rotating arm mechanism with a gripper at each end, a symmetrical exchange was made. Each of the two positions between which movement of the tools was made was located along its respective coordinate axis such that each position was equidistant from the intersection of the axes (origin). A typical mechanism for an exchange of this type is shown in U.S. Pat. No. 3,722,711 issued to W. B. Seidel. In this type mechanism a central mechanism supports arms on either side and by rotation of the central mechanism the positions in space of the arms are reversed alternately in exchange movements. The central mechanism rotates on an axis which extends from the origin of the coordinate axes and which bisects the angle between the coordinate axes. The axes of the spindle and storage position may be separated by an angle other than 90° but the axis on which the central mechanism rotates will nevertheless bisect this angle.

In some applications, it is desirable to locate positions between which exchange of parts is to be made at positions that are not equidistant from the origin of the axes through these positions. This might be done, for example, to reduce the overhang of a member which is subject to large forces when in use. Such a structure might be a machine tool spindle subjected to high forces in a machining operation. The tool or part storage apparatus might be placed at a substantial lateral or vertical distance from the spindle so that it does not interfere with spindle use.

It is therefore an object of this invention to provide an asymmetrical article exchange mechanism. The mechanism is useful in the simultaneous exchange of parts between two positions located on intersecting axes but which positions are not located equidistant from the origin of the axes.

SUMMARY OF INVENTION

The mechanism exchanges parts between two positions, each of which is located along a respective one of two intersecting coordinate axes. The distance from the origin to one of the two positions is different from the distance between the other position to the origin. An exchange support structure or hub is mounted for rotation on an axis oriented in the plane defined by the intersecting coordinate axes but this axis of rotation does not pass through the origin. Each arm of a pair of exchange arms is mounted on the hub for rotation relative thereto. These arms are in diametrically opposed positions on the hub and rotate on axes that extend in a direction transverse to and are equally spaced from the axis of rotation of the hub. An actuating mechanism rotates the hub so that the arms exchange position from one side to the other. Simultaneous with this rotation, the arms are swung on the hub by the actuating mechanism through equal angular distances so that the positions in space of the arms are exactly exchanged. The starting positions of the arms are such that each arm extends from the hub to a position adjacent to one or the other of the pick-up and operating positions.

In the embodiment shown and described hereinafter, each of the arms is equipped with a gripper device that is positioned adjacent one of the pick-up and operating stations. In operation of this embodiment, the actuating mechanism further moves the arms on the hub to swing each of the arms away from the pick-up and operating stations thereafter rotating the hub and simultaneously swinging the arms to reverse their position in space, and finally reversely swinging the arms on the hub to complete the cycle. This operation provides for part withdrawal, reversal and insertion in a complete cycle of operation. Specifically, the articles exchanged by the mechanism in the embodiment described hereinafter are tools in an automatic tool changing application.

THE DRAWINGS

DETAILED DESCRIPTION

Figure 1:
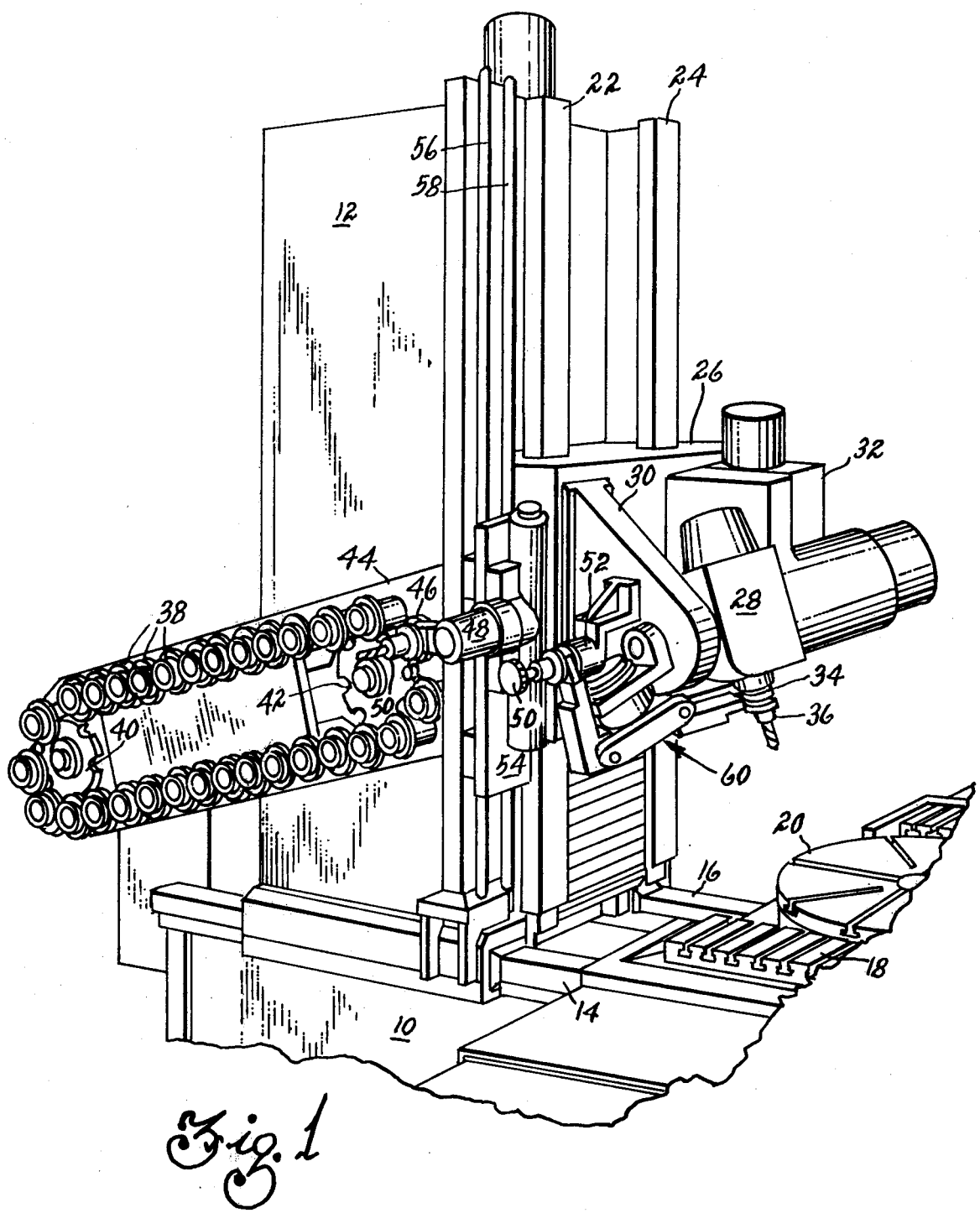
FIG. 1 is a partial view in elevation of a machine tool having an automatic tool changing mechanism employing the apparatus of this invention.

A machining center is shown in FIG. 1 which includes a base 10 that supports a column 12 movable along ways 14, 16 toward and away from a work table 18. The table 18 is movable in a direction transverse to the ways 14, 16 on similar ways (not shown). The table 18 includes a rotary fixture 20 that rotates on the table 18 about an axis that extends in a vertical direction and is perpendicular to the ways 14, 16. The column 12 also has vertical ways 22, 24 attached to the forward face and a vertically movable saddle 26 is supported for movement up and down these ways 22, 24. A spindle head 28 is supported between a mounting bracket 30 and a drive housing 32 both of which are attached to and extend from the saddle 26. The spindle head 28 is swingable on a trunnion axis extending horizontally through both the bracket 30 and drive housing 32 so that the axis of rotation of a tool spindle 34 is angularly adjustable relative to the worktable 18. The spindle 34 is adapted to receive and hold a tool 36 during a machining operation.

The column 12 also supports, on its side, a tool magazine mechanism which includes a plurality of tool recepticles 38 forming a chain around sprockets 40, 42 that rotate on a support plate 44 attached to the column 12. One of the recepticles 38 is shown in change location 46 wherein an intermediate arm device 48 is operative to grasp a tool 50 therein for withdrawal and rotation to a position for insertion of the tool 50 extending from the side of the mounting bracket 30. The device 48 is supported on a vertical carrier 54 that is movable along ways 56, 58 on the column 12. This movement enables the device 48 to grasp a tool at location 46 and then to follow to any location within the range of movement of the saddle 26 where the device can then insert that tool into the ready station bracket 52. The device 48 and carrier 54 are reversely operable to remove a tool from the ready station 52 and to transport it back to the location 46 for return of the tool to storage in an appropriate receptacle 38.

The machine described generally thus far is the same as the machine shown and described in copending U.S. patent application Ser. No. 590,027, now U.S. Pat. No. 3,953,918 assigned to the assignee of this present application. The present invention is included in the machine as the tool exchange mechanism indicated generally by the reference 60 in FIG. 1 and shown in more detail in FIG. 2.

The tool 50 is shown positioned at a pick-up station in the bracket 52 and is oriented on a first axis 62 extending centrally therethrough. The tool 36 in the spindle 34 is located on a second axis 64 that extends transversely to the first axis 62 and intersects it. The distance along the axis 62 from its intersection with the axis 64, the axis origin, to the tool 50 is substantially greater than the distance from the origin, along the axis 64 to the tool 36. The mechanism 60 exchanges tools between the bracket 52 and the spindle 34.

The exchange mechanism 60 includes a support structure 66 that is integral with and extends from the bracket 30 into the space between the spindle 34 and bracket 52. A hub 68 is supported on the structure 66 in bearings 70, 72 so that it can be rotated about an axis 74 that lies in the plane defined by the axes 62 and 64. The axis 74 is not coincident with either of the axes 62 or 64 and does not pass through their origin. The hub 68 includes a hollow pinion member 76 that is attached by machine screws 78 and which extends into the structure 66 where gear teeth 80 formed thereon are engaged by a rack 82. The rack 82 is reversely slidable through the structure 66 to produce rotation of the hub 68 in one direction and the other about the axis 74.

A bushing 84 is fixed in the structure 66 by screws 86 and extends loosely through the center of the hollow gear 76. The inner surface of the bushing 84 is splined and engages a mating slide member 88 that is oriented on the axis 74 and is axially movable therealong while being restrained from rotational movement by the splined engagement with the bushing 84. A cap and stem member 90 carries a stationary piston 94 on its lower end, secured in place by a nut 96. The slide 88 fits in sliding engagement over the piston 94 and forms a cylinder therearound. A cap 98 is threaded onto the slide 88 in a close fit around the stem member 90 to close the cylinder.

A spiral gear 100 is carried on the slide member 88 in a fixed position between a snap ring 102 and an end cap 104. The end cap 104 is secured to the slide 88 by screws 106. A spacer 108 is embraced between the cap 104 and gear 100 and held in place by screws 110. The spacer 108 is in splined engagement with the slide 88 and being fixed to the gear 100 prevents it from rotating relative to the slide 88, bushing 84 and structure 66. The gear 100 is located on the slide 88 so that it is concentric around the axis 74 along which the slide 88 moves.

On diametrically opposed sides of the hub 88 pins 112, 114 are journaled for rotation relative to the hub 68 on axes that are transverse to and spaced from the axis 74. Each of the pins 112, 114 has a spiral pinion gear 116, 118, respectively, fixed thereon and in engagement with the spiral gear 100. The pins 112, 114 each also carry an arm structure 120, 122 respectively, which is rigid with the pins 112, 114 and swing when the gears 116, 118 and pins 112, 114 are caused to rotate relative to the hub 68. Each of the arms is fitted with a tool gripper 124, 126 which is operable to engage and firmly hold one of the tools 50, 36. The arm and gripper structure is the same as that shown and described in copending U.S. patent application Ser. No. 617,960, now U.S. Pat. No. 3,964,616, assigned to the same assignee as is this application. The arm structure and the description of operation in the cited application is incorporated herein by reference.

Figure 2:
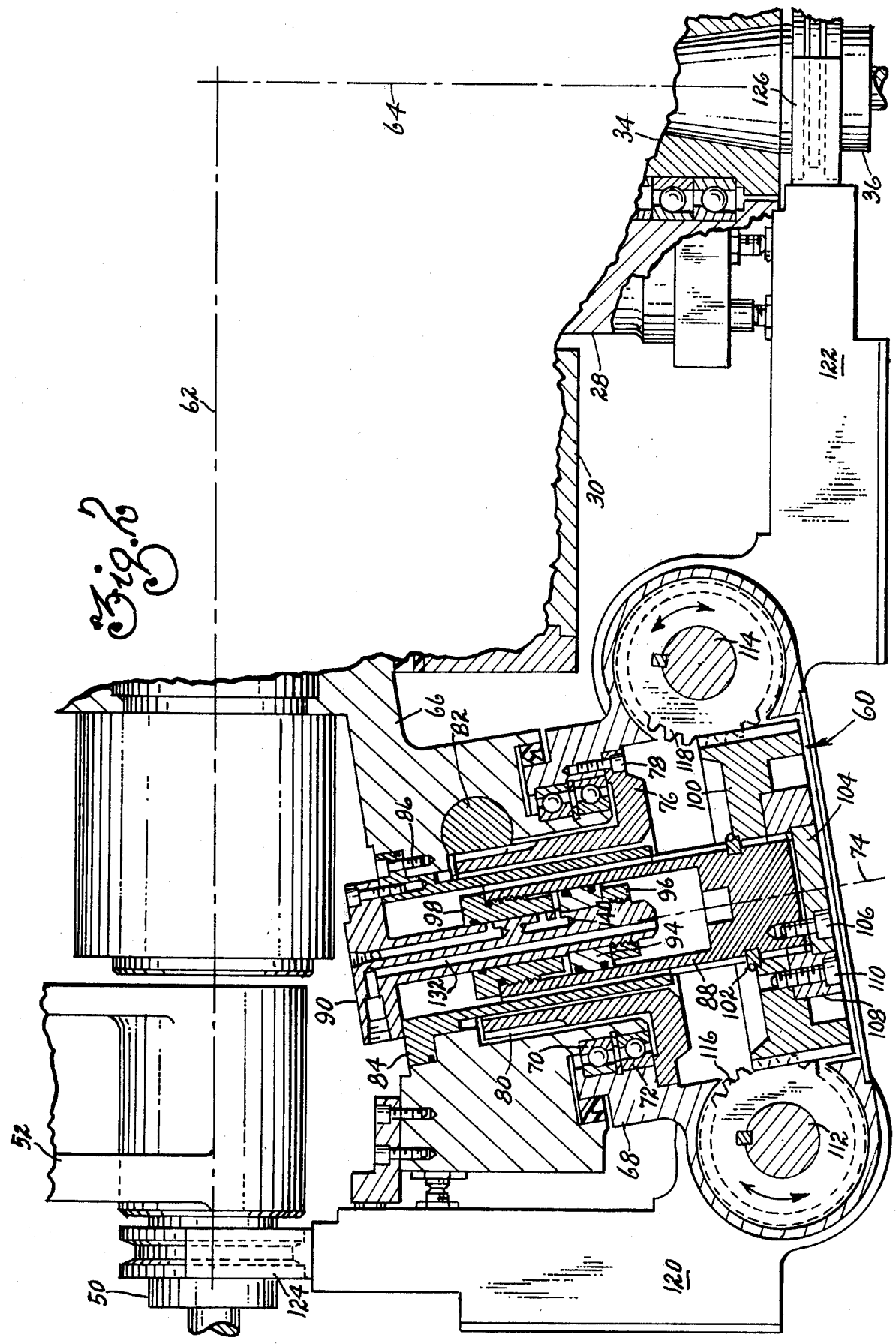
FIG. 2 is a detailed view in partial section of a specific embodiment of this invention.
Figure 3:
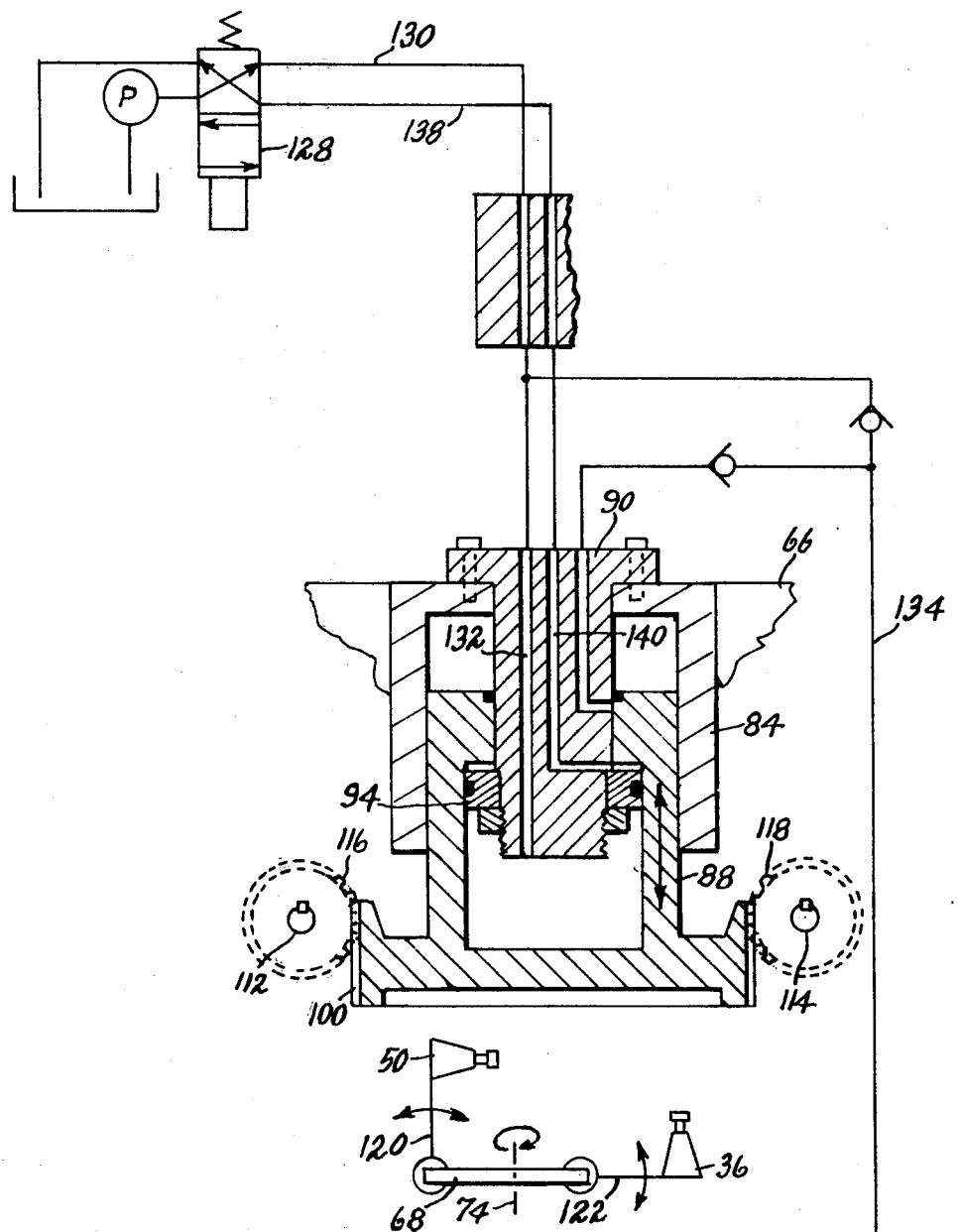
FIG. 3 is a schematic drawing of a hydraulic circuit for operation of the mechanism of FIG. 2.

The operation of the exchange mechanism can be understood by reference to the simplified schematic operating circuit diagram of FIG. 3. A valve 128 in the condition shown connects fluid under pressure to a hydraulic line 130. This line 130 connects through an interdrilled passage 132 to the lower side of the piston 94 and forces the slide 88 to and holds it in the position shown in FIG. 2. At the same time pressure from the line 130 is connected through a line 134 and a valve 136 to one end of the rack 82. Fluid line 138 is connected through the valve 128 to the reservoir and is at atmospheric pressure. Line 130 connects through passage 140 to the upper side of the piston 94. The valve 136 connects atmospheric pressure to the end of the rack 82 opposite the one to which pressure is applied when the valve 136 is in the condition shown. As the circuit has been described, the arms 120 and 122 are held in the position shown in FIG. 2 with the grippers 124, 126 holding tools located in the bracket 52 and spindle 34.

The first step in an exchange is to energize the valve 128 so that the lines 130 and 138 are connected to return and pressure respectively. This reverses the pressure differential on the piston 94 and since it is stationary, the slide 88 shifts upward to carry the gear 100 along the axis 74 toward the structure 66. The gear 100 being a spiral toothed gear acts initially as a cam to produce initial rotation of the pinion gears 116 and 118 with which the arms 120, 122 swing. Therefore, the arm 120 swings counterclockwise, and the arm 122 swings clockwise in first angular motion increments. This motion withdraws the tools 50 and 36 from the bracket 52 and spindle 34. After this occurs, the valve 136 is operated to reverse the pressure differential on the rack 82 causing it to slide in the structure 66 and to rotate the gear 80 with which it is engaged. This produces rotation of the hub 68 in one direction to carry the arms around relative to the structure 66 through 180° of travel. While this occurs, the pinions 116, 118 are caused to roll on the stationary gear 100 so that their angular positions on the hub relative to the axis 74 are exactly reversed. This is a second increment of angular swinging motion of the arms 120, 122 on the hub 68. The arm 122 is positioned to place the tool 36, withdrawn from the spindle 34, into the bracket 52. Similarly, the arm 120 is positioned to place the tool 50 in the spindle 34.

To complete the exchange, the valve 128 is deenergized and the lines 130, 138 are connected back to pressure and atmosphere respectively. The slide 88 moves back to the position shown and the gear 100 forces the pinions to reversely rotate through their initial increment of angular swinging motion to insert the tools 50, 36 into the spindle 34 and bracket 52, respectively (reverse of the positions shown in FIG. 2). The valve 136 does not reversely operate at this time. It operates only once in each exchange cycle to reverse the position of the arms 120, 122 relative to the spindle 34 and bracket 52. The arms 120, 122 thereby swing alternately in one direction and the other by operation of the rack 82 between one exchange operation and the next.

After an exchange cycle, the grippers 124 and 126 are released to permit use of the respective tool in the spindle 34 and replacement of the respective tool in the bracket 52 with the next tool to be placed in operation after the next exchange cycle.

It can be seen that the mechanism provides a compact, simply operated mechanism which exchanges tools in an asymetric motion, one that exchanges tools between positions which are located at positions that are at significantly different distances along axes extending from a common origin. As shown in FIG. 2 the overhang or extension of the spindle 34 can be minimized while the location of a tool in a ready position in the bracket 52 is at a substantial lateral distance from the spindle 34 to reduce interference during use of the tool in the spindle.

What is claimed is:

1. In a machine tool having a pick-up station aligned on a first axis and an operating station aligned on a second axis intersecting the first axis and defining a plane therebetween, the pick-up and operating stations being at unequal distances from the intersection of the first and second axes, an exchange mechanism comprising:
   a. a hub;
   b. means for supporting the hub for rotation on a third axis extending in the plane defined by the first and second axes and spaced entirely away from the point of intersection of the first and second axes;
   c. a pair of arms supported on the hub at diametrically opposed locations for rotation about respective axes transverse to the third axis; and
   d. actuating means for rotating the hub on the third axis and simultaneously swinging the arms through equal angular distances about the respective transverse axes whereby the arms exchange positions in space and relative to the pick-up and operating stations.

2. The exchange mechanism of claim 1, wherein
   a. an additional means is provided to cause the actuating means to swing the arms about the respective transverse axes through a fixed angular distance, said motion being independent of the first mentioned motion produced by the actuating means.

3. The exchange mechanism of claim 2, wherein:
   a. a control means is provided for first operating the additional means in one direction, thereafter operating the actuating means to produce the combined rotation and swinging movement, and finally reversely operating the additional actuating means.

4. The exchange mechanism of claim 1, wherein the actuating mechanism includes:
   a. a spiral gear concentric about the third axis, the hub being rotatable relative thereto; and
   b. a pair of spiral pinions, each of said pair fixed to a respective one of the arms, concentric about the respective transverse axis, and engaged to roll in mesh with the spiral gear upon rotation of the hub to angularly swing the arms.

5. The exchange mechanism of claim 4, wherein the actuating mechanism includes:
   a. a gear attached to the hub concentric with the third axis;
   b. a toothed rack engages the gear attached to the hub; and
   c. a means is provided for alternately shifting the rack between one and other of two positions whereby the hub is rotated a fixed amount in corresponding alternate directions.

6. The exchange mechanism of claim 4, wherein the actuating mechanism includes:
   a. a means for shifting the spiral gear along the third axis to produce angular motion of the arms independent of the angular motion produced when the pinions roll on the spiral gear.

7. The exchange mechanism of claim 6, wherein the means for shifting the spiral gear includes:
   a. a spindle extending in the direction of the third axis and the hub is rotatably supported thereon;
   b. a slide member received on the spindle for movement thereon in the direction of the third axis and the spiral gear is fixed thereto;
   c. a piston and cylinder motor supported between the slide and spindle; and
   d. a means for operating the piston and cylinder motor selectively in alternate directions between fixed positions.

8. The exchange mechanism of claim 7, wherein the means for rotating the spiral gear includes:
   a. a gear attached to the hub and extending concentrically around the spindle;
   b. a toothed rack supported on the spindle for reciprocating motion transverse to the third axis and is drivingly engaged with the gear attached to the hub; and
   c. a means for shifting the rack between one and the other of two positions to rotate the hub a fixed amount in corresponding alternate directions independent of operation of the piston and cylinder motor.

9. In a machine tool having a pick-up station adapted to receive a tool aligned on a first axis and a tool operator adapted to receive a tool aligned on a second axis intersecting the first axis and defining a plane therebetween, a tool exchange mechanism comprising:
   a. a hub rotatable on a third axis lying in the plane defined by the first and second axes, the third axis spaced from and not including the intersection of the first and second axes;
   b. a pair of arms, each arm supported on the hub for rotation relative thereto about an axis spaced from and transverse to the third axis, said arms located at diametrically opposed positions on the hub;
   c. each arm having a spiral pinion fixed thereto and concentric around the respective axis of rotation thereof on the hub;
   d. a spiral gear inside the hub, concentric about the third axis, and movable axially therealong a limited amount, said spiral gear in driving engagement with said pinions, and the hub rotatable therearound on the third axis;
   e. a means for axially moving the spiral gear in one direction from a starting position to swing each of the arms on the hub in a respective first direction;
   f. a means for rotating the hub about the third axis to roll the pinions therearound and exchange positions of the arms in space;
   g. a means for axially moving the spiral gear back to the starting position to reversely swing each of the arms on the hub; and
   h. a means on each of the arms for holding a tool whereby swing of the arms on the hub and rotating of the hub exchanges tools held thereby between positions in alignment on the first and second axes.

10. The mechanism of claim 9, wherein:
a. the third axis extends in a direction across the first and second axes and intersects each at a point remote from the point of intersection of the first and second axes.

11. The mechanism of claim 9, wherein:
a. the third axis intersects the first axis at an angle different from the angle at which the third axis intersects the second axis, each point of intersection with the third axis remote from the intersection of the first and second axes.

12. The tool exchange mechanism of claim 9, wherein:
a. a spindle extends in the direction of the third axis and the hub is supported thereon;
b. a slide is supported by the spindle and is movable therealong in the direction of the third axis;
c. the spiral gear is fixed to the slide; and
d. a reciprocating motor is supported between the spindle and slide, said means for axially moving the spiral gear in one direction and back operating to alternately energize the motor to move the slide between spaced positions on the spindle.

13. The tool exchange mechanism of claim 12, wherein the means for rotating the hub includes:
a. a gear on the hub concentric about the third axis;
b. a toothed rack slidable in the spindle in a direction transverse to the third axis and engaged with the hub gear; and
c. a means for selectively moving the rack between predetermined positions to rotate the hub between corresponding angular positions on the spindle.

* * * * *